United States Patent [19]

Nitta et al.

[11] Patent Number: 5,109,511
[45] Date of Patent: Apr. 28, 1992

[54] SHARED RESOURCE MANAGING METHOD AND SYSTEM

[75] Inventors: Jun Nitta, Ebina; Shoji Yamamoto, Chigasaki; Shigeru Yoneda, Ebina, all of Japan

[73] Assignee: Hitachi, Ltd., Tokyo, Japan

[21] Appl. No.: 359,035

[22] Filed: May 30, 1989

[30] Foreign Application Priority Data

May 31, 1988 [JP] Japan .................................. 63-133882

[51] Int. Cl.⁵ .............................................. G06F 9/46
[52] U.S. Cl. .............................. 395/650; 364/DIG. 1; 364/281.6; 364/281.7
[58] Field of Search ................................ 364/200, 900

[56] References Cited

U.S. PATENT DOCUMENTS

| | | | |
|---|---|---|---|
| 3,623,018 | 11/1971 | Evans et al. | 364/200 |
| 4,053,948 | 10/1977 | Hogan et al. | 364/200 |
| 4,399,504 | 8/1983 | Obermarck et al. | 364/200 |
| 4,480,304 | 10/1984 | Carr et al. | 364/200 |
| 4,742,450 | 5/1988 | Duvall et al. | 364/200 |
| 4,847,754 | 7/1989 | Obermarck et al. | 364/200 |

Primary Examiner—Thomas M. Heckler
Attorney, Agent, or Firm—Fay, Sharpe, Beall, Fagan, Minnich & McKee

[57] ABSTRACT

In a method of and a system for managing access to shared resource elements between processes subjected to parallel processing by use of a hash table under a multiprocessor environment or a multi-task processing environment, each of entries of the hash table pointer information indicative of a pointer to any one of the resource elements, counter information for holding the occurrence of registration into the hash table and counter information for limiting the number of times of search for has table entry, and the entry of the hash table is updated by an instruction which performs as inseparable operation of referring to a status variable on a main storage and updating the status variable in accordance with the value thereof. Thereby, the management of data suitable for high-speed access to a large quantity of data elements on the main storage can be performed with no lock operation under the multiprocessor environment or the multi-task processing environment.

9 Claims, 8 Drawing Sheets

SHARED RESOURCE MANAGING METHOD AND SYSTEM

BACKGROUND OF THE INVENTION

The present invention relates to a method of and a system for managing shared resources, and more particularly to a shared resource management technique in which access to a large quantity of shared resource elements as the object of management between processes to be subjected to parallel processing is serialized under a multiprocessing environment or a multiprogramming environment on an electronic computer.

In general, a serialization of access to a shared resource is realized by a series of instructions called "lock" and "unlock" operations and is usually provided as one function of an operating system (OS). In this access control method, when collision on access occurs, the processing by any process other than a locked process is interrupted and the other process is brought into a waiting condition. However, such an interruption causes an excess overhead of the system on several occasions, especially, under a tightly-coupled multiprocessor environment where a main storage (MS) is shared by a plurality of instruction processors.

A method of realizing the serialization of access between processes subjected to parallel processing with no lock operation is disclosed by, for example, U.S. Ser. No. 787221 filed Oct. 15, 1985, now U.S. Pat. No. 4,847,754 (JP-A-62-92061). In the above-referenced method, when collision on access between processes is present, the processing by any one of processes in collision with each other is transferred and entrusted to the other of those processes. According to this method, it is possible to perform the retrieval, registration and/or deletion of data elements for a list of data on a main storage with no interruption of any process.

The above-mentioned prior art is mainly directed to a one-dimensional list structure in which data are linked by a pointer chain. Such a data list is suitable for sequential retrieval or direct retrieval in the case where the number of elements is small. However, the retrieval overhead increases linearly with respect to the number of elements. Therefore, in the case where random access to a large quantity of elements occurs, it does not necessarily follow that such a data list is an optimum data structure.

A preferable data structure suitable for the case where random access to a large quantity of elements occurs is one for which a hashing method as high-speed retrieval means can be used. However, the above-mentioned prior art in which the processing by one process is entrusted to the other process, is not applicable to a data structure which uses a hashing method.

SUMMARY OF THE INVENTION

Accordingly, an object of the present invention is to provide a shared resource managing method and system in which the management of data using a hashing method suitable for high-speed access to a large quantity of data elements on a main storage can be performed with no lock operation under an inter-process environment such as multiprocessor environment where a parallel processing is to be made.

To attain the above object, in a shared resource managing method and system according to one feature of the present invention in which access to shared resource elements between processes subjected to parallel processing is managed by use of a hash table, each of entries of the hash table includes pointer information indicative of a pointer to any one of the resource elements and counter information for holding the occurrence of registration of a data element into the hash table, and the entry of the hash table is updated by an instruction which performs an inseparatable (or indivisible) operation of referring to a status variable on a main storage and updating the status variable in accordance with the value thereof. In order to provide improved high-speed search (or access), each entry of the hash table may include counter information indicative of the uppermost limit for the number of times of search of the hash table defined on the basis of record information concerning the number of times of overflow from a home position.

The counter information in the hash table entry for holding the occurrence of registration by a pointer of data element (hereinafter simply referred to as "registration counter") provides means for confirming that during the processing of registration of a certain data element by a certain process the processing of registration of another data element having the same home position as the certain data element is not performed in parallel by another process. The provision of the registration counter makes it possible to prevent double registration of the same data element into the hash table. Also, since one registration counter is provided not for the whole of the hash table but for each table entry, the probability of occurrence of collision in access to the registration counter can be reduced.

The counter information provided for limiting the number of times of table search (hereinafter referred to as "search counter") indicates the maximum number of hash table entries which must be scanned or searched when retrieval of or search for a data element registered in the hash table is to be made on the basis of given key information indicative of the object of search. The provision of the search counter makes it possible to decide the presence/absence of registration of a specified data element in a certain hash table entry at high speed with no need of searching all of the table entries.

The updating of the whole or a part of the hash table entry including the above-mentioned information is made by use of the instruction which performs the inseparatable operation of referring to the status variable on the main storage and updating the status variable in accordance with the value thereof, as mentioned above. This instruction is called a read-modify-write instruction. The use of such an instruction ensures the consistency of each of the counter information and the pointer information. In connection therewith, it should be noted that if a load/store instruction is used, matching between data cannot be maintained since during a period of time from the reference to a status variable to the registration thereof the status variable may be updated by another process.

DESCRIPTION OF THE PREFERRED EMBODIMENTS

Embodiments of the present invention will now be explained with reference to the accompanying drawings.

Figure 1:
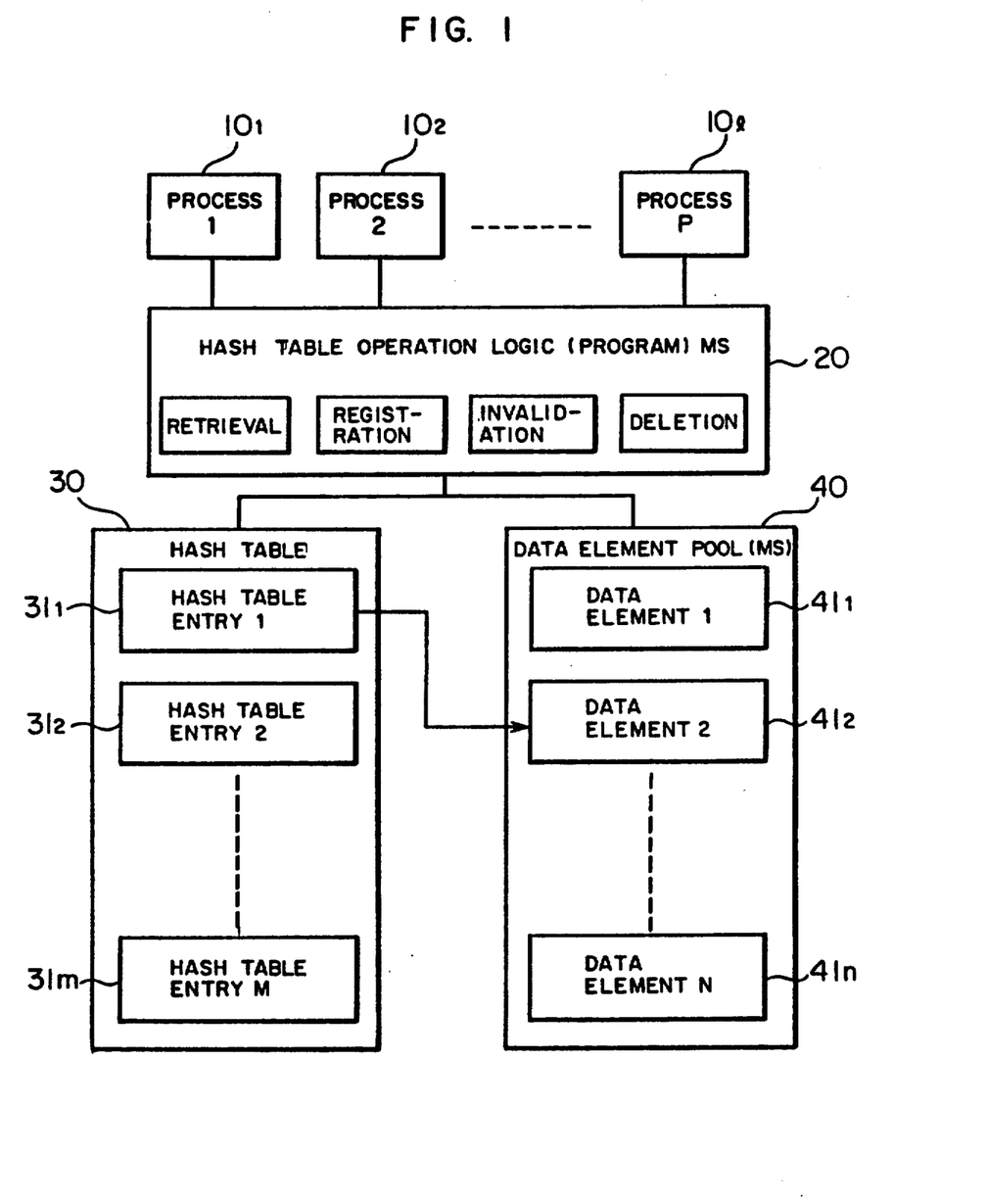
FIG. 1 is a block diagram for schematically explaining the operation of a computer system showing an embodiment of the present invention.

FIG. 1 is a block diagram schematically showing the function of a computer system according to an embodiment of the present invention. In the Figure, shown an example is in which a plurality of processes of tasks $10_1$, $10_2,-10_l$ operating in parallel make access through a hash table operation logic or program '20 to data elements $41_1$, $41_2,-41_n$ in a data element pool 40, for example, a main storage (MS), as a shared resource. In hardware, each process may usually correspond to a CPU. The hash table operation logic 20 serializes access from the plurality of processes $10_1$, $10_2,-10_l$ to the data elements $41_1$, $41_2,-41_n$ by operating hash table entries $31_1$, $31_2,-31_m$ in a hash table 30.

The data elements $41_1$, $41_2,-41_n$ may be arbitrary so long as they represent on a main storage a system resource which is shared by a plurality of processes. Examples of such a system resource include a main storage frame in a virtual storage system and input/output buffers in a file management system. The present invention provides an approach by which access to a finite number of but a large quantity of data elements on a main storage is effected with high efficiency under a multiprocessor environment or a multi-task processor environment.

The present invention can be realized on any processor having a read-modify-write instruction or an instruction which performs an inseparatable operation of referring to a status variable on a main storage and updating the status variable in accordance with the value thereof. Many known processors are provided with such an instruction. For example, a CS (Compare and Swap) instruction or a CDS (Compare Double and Swap) instruction used in HITAC M-SERIES (trade name of Hitachi, Ltd.) processors corresponds to the read-modify-write instruction. Details of the CS and CDS instructions are described in Manual "HITAC M-SERIES PROCESSORS" published by Hitachi, Ltd. The following explanation of the present embodiment will be made using the CS and CDS instructions as a matter of convenience. The two instructions are different in that the CS instruction handles a status variable having a one-word length while the CDS instruction handles a status variable having a double-word length.

The hash table operation logic or program 20 includes four elementary or fundamental functions of the retrieval, registration, invalidation and deletion of data element. As will be mentioned below, a highly composite function can be realized by combining those elementary functions. Details of the respective elementary functions and an ,embodiment of the composite function will be explained below using FIGS. 7 to 12.

Figure 2:
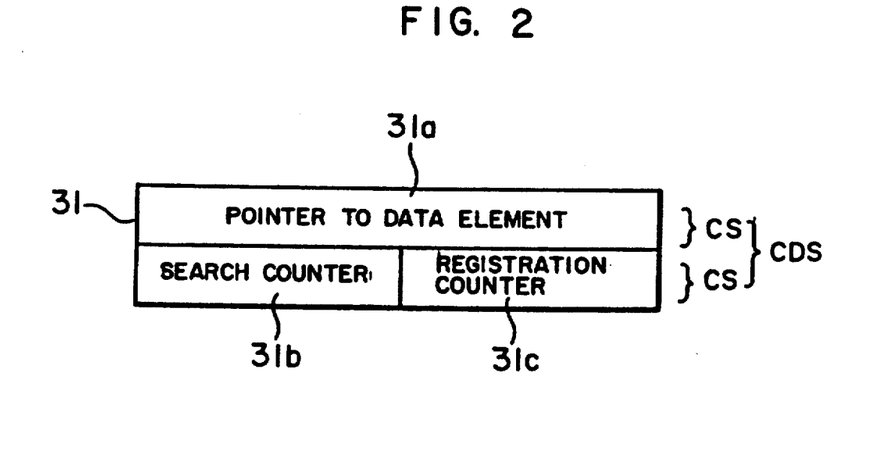
FIG. 2 shows in format the contents of a hash table entry.

FIG. 2 shows the contents of each hash table entry which have a format indicative of a feature of the present invention. The hash table entry includes a pointer $31a$ (of, for example, 4-byte length) to data element, a search counter $31b$ (of 2-byte length) and a registration counter $31c$ (of 2-byte length). The hash table entry has a double-word length and is updated by a CDS instruction. The pointer $31a$ to data element is formed with a one-word length and is updated by a CS instruction. Each of the search counter $31b$ and the registration counter $31c$ is formed with a half-word length and these counters are simultaneously updated by a CS instruction. The lengths and arrangement of the fields (pointer, search counter and registration counter) in the hash table entry may be different depending on the instruction specifications of a processor used, but it is required that the whole or a part of the hash table entry can be updated by the CS instruction, the CDS instruction or an instruction similar to the CS or CDS instruction.

The registration counter $31c$ in each hash table entry is counted up when a data element having as its home position that hash table entry is registered into the hash table. The registration counter is wrapped around when the counter is used up to its maximum value. The term of "home position" is defined as an entry on the hash table which corresponds to a hash value determined at the time of the first hashing. When a certain data element is to be registered into the hash table, there may be a case where the home position of that data element has already been occupied by another data element, that is, a case where collision occurs. In such a case, the data element under consideration is registered into an overflow position. The term of "overflow position" means an alternate or substitutional entry which is determined in accordance with a certain algorithm when collision on home position occurs. A well known algorithm may be used for determining the home position or the overflow position.

The registration counter $31c$ is used for confirming that when a certain process operates to register a certain data element into the hash table, the registration or updating of another data element having the same home position as the certain data element is not performed in parallel by another process. In other words, the presence/absence of occurrence of simultaneous access from a plurality of processes or the presence/absence of occurrence of collision is detected. In a registration logic or processing, a registration counter value given as an input is saved and the current registration counter value is compared with the saved registration counter value at the point of time of completion of the registration processing. If both the counter values are equal to each other, the current counter value is incremented by one to produce a new registration counter value. On the other hand, if the current counter value and the saved counter value are not equal to each other, the occurrence of collision is reported or informed to a requesting process. The comparison and the updating of counter value just mentioned are performed or executed as one inseparatable operation by a CS or CDS instruction.

The search counter $31b$ in each hash table entry is provided for indicating the number of data elements which have as the home position that hash table entry and have been registered in the hash table. The search counter provides a criterion for the at most upper limit for the number of times of search for hash table entry to be performed when the retrieval of a data element is to be made in accordance with a hashing algorithm used.

Figure 3:
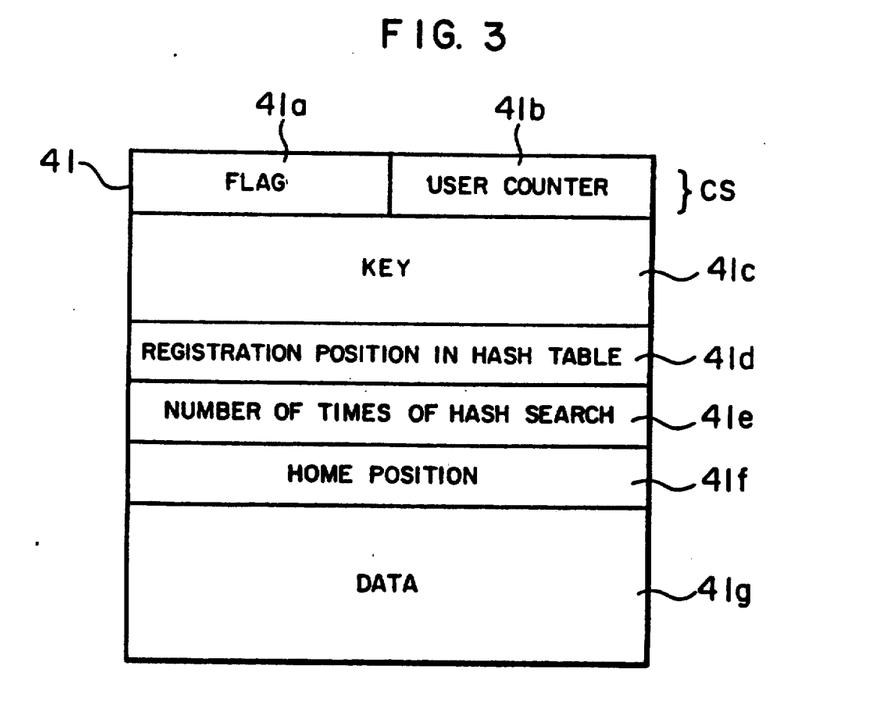
FIG. 3 shows in format the contents of a data element.

FIG. 3 shows a record table representative of the contents of each data element. Each data element is uniquely identified by its key 41c. The correspondence of the data element and the key to each other is not always fixed, but may be changed. For example, if a certain data element is deleted from the hash table, the key in that data element may be changed so as to represent another data. This is called replacement of data element. A flag 41a is provided for indicating the status of the data element. It is possible to choose flag contents suited to each of many concrete applications of the present invention. In the present embodiment, an invalidation indicator indicating that the contents of the data element are invalid is provided as the flag 41a. A user counter 41b indicates the degree of multiplicity or number of processes which currently make access to the data element. One word is allotted to the flag 41a and the user counter 41b and they are updated by a CS instruction. The other fields in the data element can be arbitrarily established. In order to make it possible to perform a processing for deletion of data element, the present embodiment is provided with a field for setting therein a registration position 41d in the hash table, that is, the address of a hash table entry in which the data element is registered (or a back pointer), a field for setting therein the number of times of hash search 41e, that is, the number of times of overflow search indicative of the number of times of hashing performed until the registration position is found out, and a field for setting therein a home position 41f (open-hashing). Reference numeral 41g designates a data field.

Figure 4:
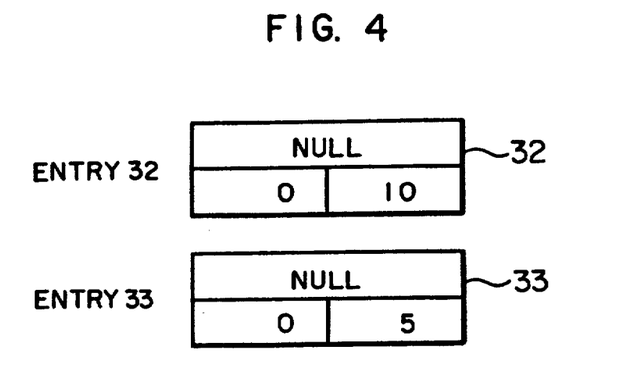
FIGS. 4 to 6 are views for explaining a method of registering data elements into a hash table.
Figure 5:
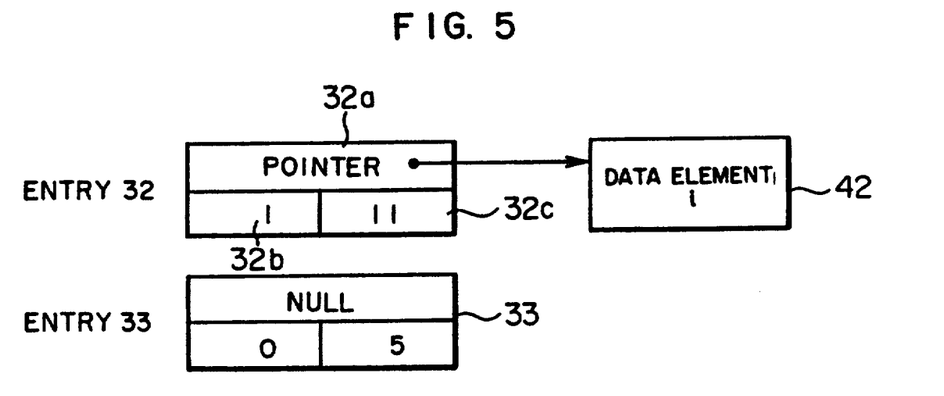
Figure 6:
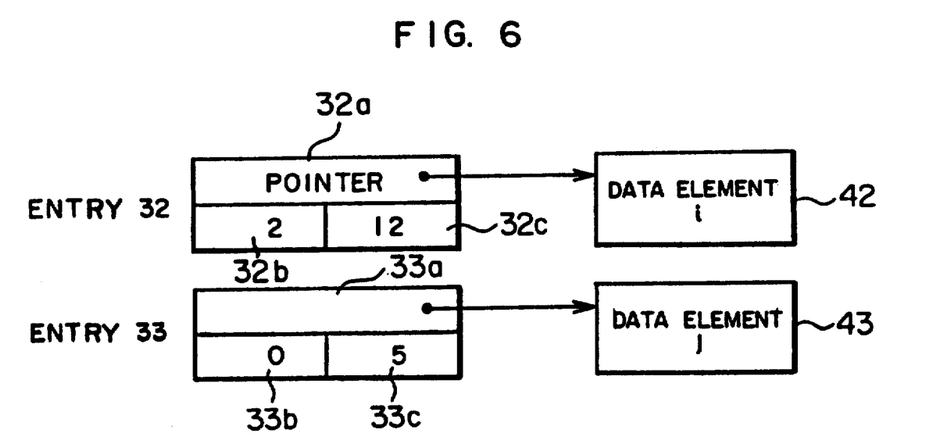

FIGS. 4 to 6 illustrate a procedure by which two data elements 42 and 43 having the same home position are registered into the hash table. The home position of each of the data elements 42 and 43 is a hash table entry 32 and a hash table entry 33 is an overflow position. FIG. 4 shows a state in which the data elements 42 and 43 are not yet registered. FIG. 5 shows a state in which the data element 42 is registered in the hash table entry 32 with a search counter 32b and a registration counter 32c thereof counted up respectively. FIG. 6 shows a state in which the data element 43 is further registered. Since the registration into the entry 32 has already been made, the data element 43 is registered in the overflow position which is the next entry 33. It should be noted that when the data element 43 is registered into the hash table entry 33, a search counter 33b and a registration counter 33c of the overflow position are subjected to no change but the counters 32b and 32c of the home position of the data element 43 are updated (or counted up).

Detailed explanation of respective hash table operation logics will now be made referring to flow charts from which well known processings such as error processings are omitted for simplification of explanation.

RETRIEVAL PROCESSING

Figure 7:
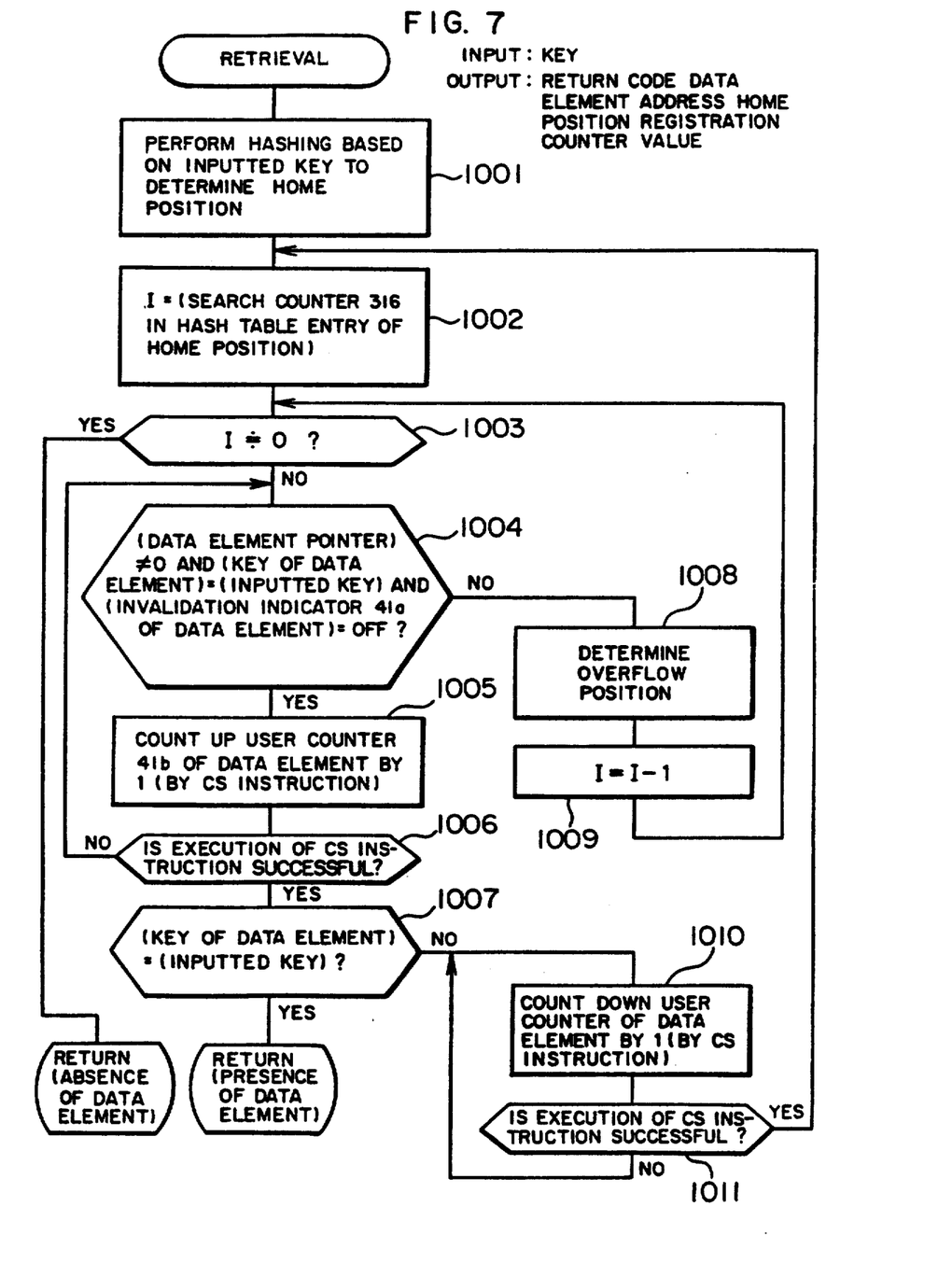
FIG. 7 shows a flow chart of a hash table retrieval logic according to the embodiment of the present invention.

FIG. 7 shows a flow chart of a retrieval logic or processing. An input for the retrieval logic includes a key for a data element to be searched or a search for a data element having the value of a specified key is requested. Hashing is made on the basis of the inputted key to determine a home position (step 1001). The algorithm of hashing can be arbitrarily established. After the home position has been determined, a search counter 31b in a hash table entry of the home position is set to a work variable I (step 1002). In step 1003, a judgement is made of whether or not I is equal to 0. In the case of I=0, return is made with a return code set to indicate that the data element under consideration has not been found. In the case of I>0, a judgement is made of whether or not a data element registered in the hash table entry of the home position is the data element to be searched (step 1004). If the result of judgement in step 1004 is affirmative (YES), a user counter of the data element under consideration is counted up by 1 (one) by a CS instruction (step 1005). Thereby, access to this data element by the retrieval requesting process is declared. In the case where the updating of the user counter by the CS instruction has resulted in failure or in the case where collision on user counter access with another process has occurred (step 1006), the process from the judgement of the contents of data element (step 1004) is done over again. Since the other process is operable in a period of time from the judgement of the contents of data element (step 1004) to the updating of the user counter (step 1005), there may be a case where the contents of the data element under consideration are rewritten. This may occur when the current value of the user counter of that data element is 0 (zero) and hence the replacement of data element occurs regarding the data element as being accessed by none of processes. Therefore, after the user counter value has been counted up by 1, the contents of the data element are examined again (step 1007). If the key of the data element is coincident with the inputted key, normal return is made. On the other hand, if coincidence is not present between the keys, the user counter is counted down by 1 (one) by a CS instruction (steps 1010 to 1011) so that retrieval is done over again (or retried). Steps 1010 to 1011 are a procedure necessary for multi-access. In the case where the result of judgement in step 1004 is negative or the registered data element is different from the data element to be searched, an overflow position is determined (steps 1008 to 1009) so that retrieval is continued. As has already been mentioned, the algorithm for determining the overflow position may be arbitrary.

As can be understood from FIG. 7, the scan or search of hash table entries is completed with loops the number of which is at most equal to the number of the search counters. If a hash function suited to the key distribution of data to be searched is prepared and the total number of hash table entries provided is sufficiently larger than the number of data elements which may be simultaneously registered, it is possible to make the expected value of the search counter equal to or smaller than 1, thereby realizing a high-speed retrieval processing.

REGISTRATION PROCESSING

Figure 8:
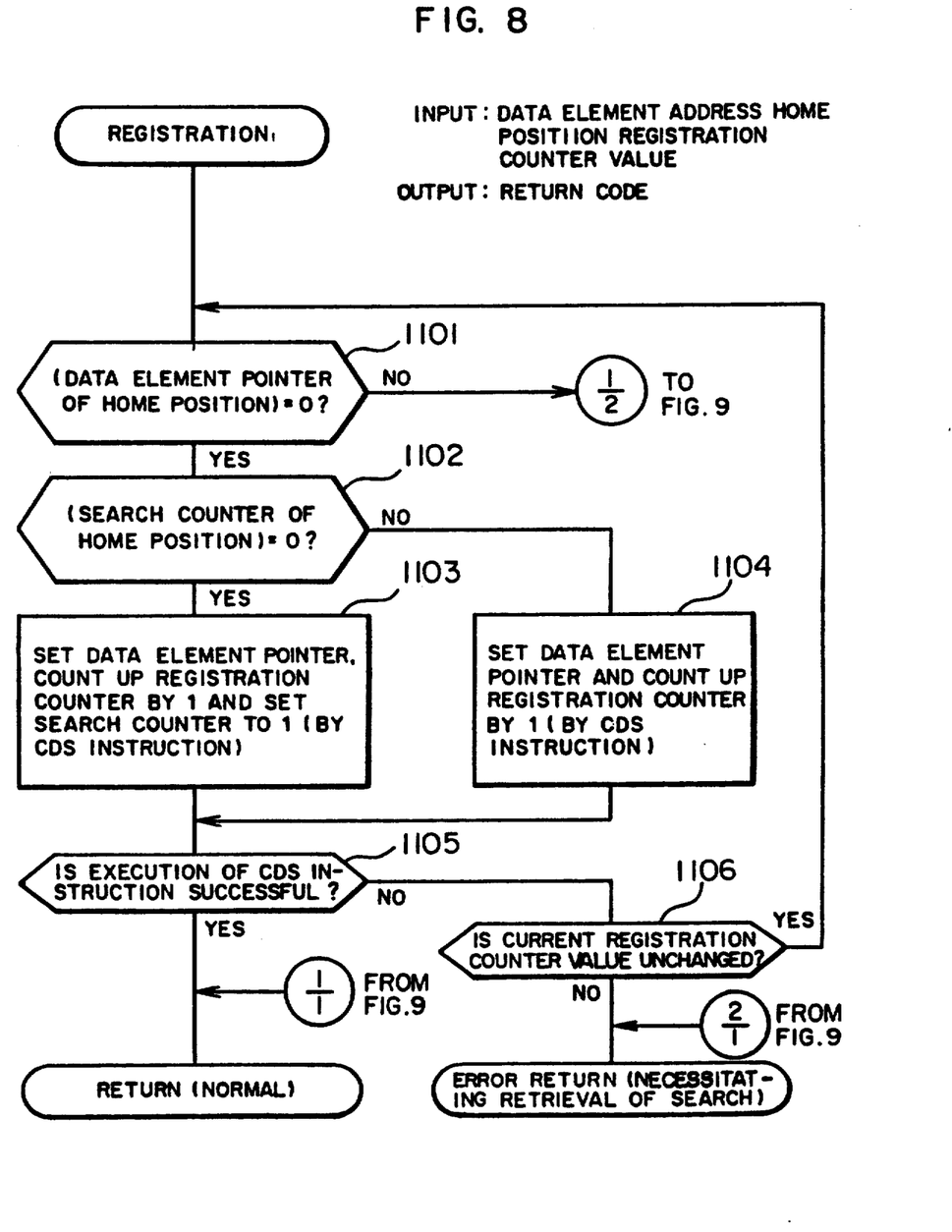
FIGS. 8 and 9 respectively show flow charts of a write processing and an overflow processing in a hash table registration logic according to the embodiment of the present invention.
Figure 9:
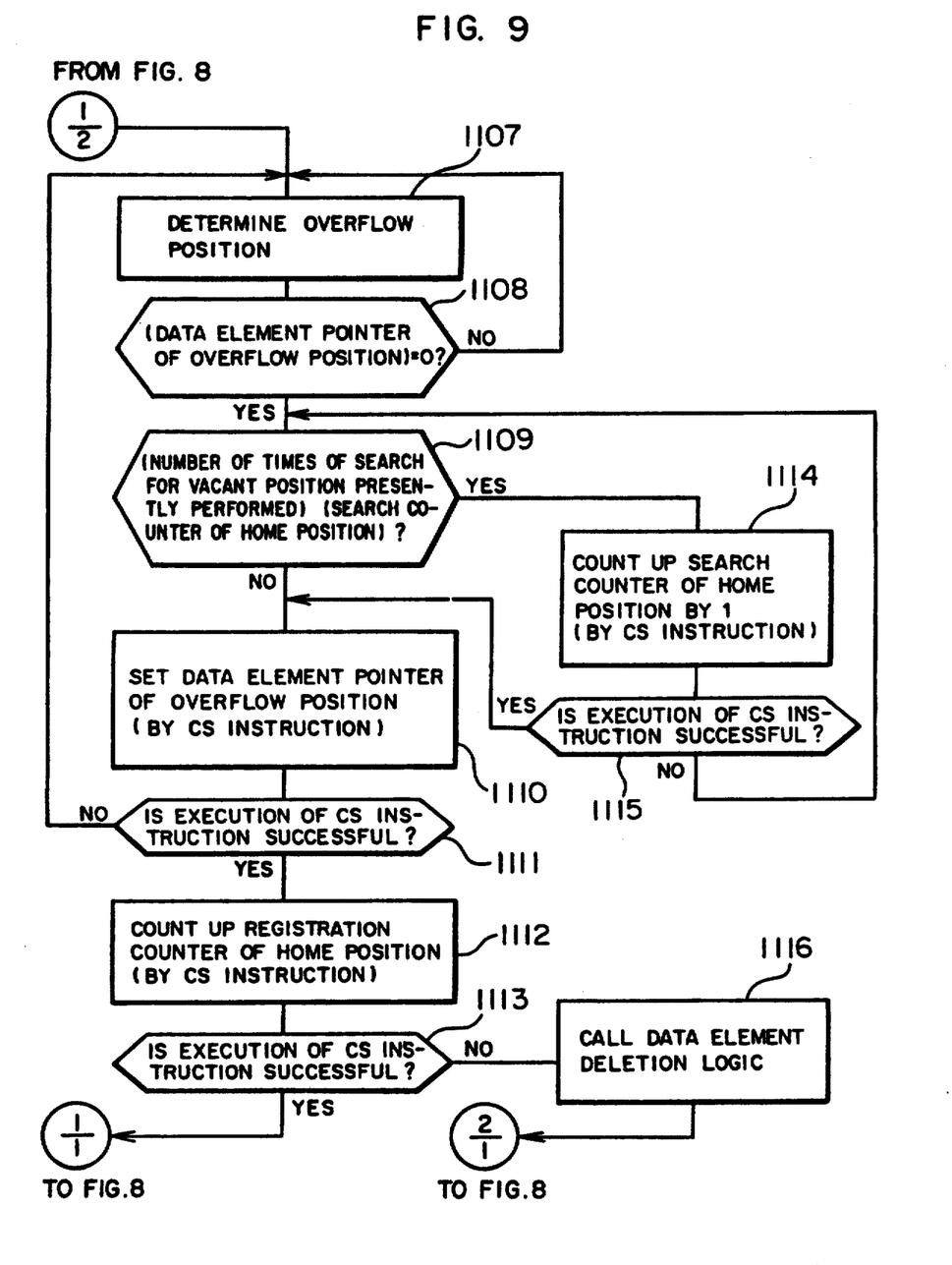

FIGS. 8 and 9 show as a whole a flow chart of a registration logic or processing important to the present invention. An input for the registration logic includes the address of a data element to be registered, the home position of that data element and the value of a registration counter of the home position and requests the registration of a data element having a desired key value. In general, in order to prevent double registration of data element, a retrieval processing is performed prior to the registration processing to confirm whether or not the data element to be registered has already been registered. The home position and the registration counter value used in the registration processing are a part of the outputs obtained in the above-mentioned retrieval processing. This registration counter value is one saved at the point of time when the home position has been determined during the retrieval processing, and it is used for judging whether or not collision with a registration processing by another process occurs during a period of time until completion of the present registration processing.

In the registration processing, whether or not the home position of the data element to be registered has already been occupied is first examined (step 1101). In the case where the home position has not yet been occupied, each field of the hash table entry is updated by a CDS instruction (steps 1102, 1103 and 1104). In this case, if the search counter value is equal to 0, the search counter value is set or changed to 1 (step 1103). On the other hand, if the search counter value is equal to or larger than 1, no updating of the search counter value is made (step 1104). In the case where the execution of the CDS instruction in step 1103 or 1104 has resulted in success, normal return is made (1105). In the case where the updating by the CDS instruction has resulted in failure, the current value of the registration counter is compared with the inputted counter value in order to examine which a processing by another process has caused collision with the registration processing by the process under consideration (step 1106). If the current counter value is equal to the inputted current value, it means that the collision with a deletion processing by the other process has occurred. Therefore, the registration processing is done over again (or retried). On the other hand, if both the counter values are not equal to each other, it means that the collision with a registration processing by the other process has occurred. Therefore, error return is made with a return code established to indicate a need of retrial. In this case, the retrial is made starting from the retrieval processing performed prior to the registration processing by the process under consideration.

The process flow in the case where the home position has already been occupied is shown in FIG. 9. First, an overflow position is determined (step 1107) and a judgement is made of whether or not a hash table entry of the overflow position has been occupied by another data element (step 1108). In the case where the hash table entry of the overflow position has been occupied, the next overflow position is searched or determined. If the maximum number of data elements simultaneously registered is not larger than the total number of hash table entries, an overflow position is sure to exist. Though the error of overflow of the hash table may occur when the total number of hash table entries is smaller than the maximum number of data elements, a processing for eliminating such an error is omitted from FIG. 9 for simplification of illustration.

Next, a judgement is made of whether or not the number of times of search for vacant position presently performed is larger than the value of the search counter of the home position (step 1109). If the result of judgement in step 1109 is affirmative, the value of the search counter is changed to the number of times of search presently performed by a CS instruction (steps 1114 and 1115). Next, a pointer to the data element concerned with the overflow position is set into the hash table entry of the overflow position by a CS instruction (step 1110). The execution of this CS instruction results in failure when the registration of the data element into the hash table entry of the overflow position is in collision with another process. In that case, whether or not the registration into the next overflow position is possible is examined. The collision just mentioned is not limited to a collision between registration processings of data elements having the same home position. If the execution of the CS instruction in step 1110 has resulted in success, the registration counter of the home position is counted up by a CS instruction (step 1112). In the case where the execution of the last CS instruction has resulted in success, the registration of the data element under consideration is completed and normal return is made. On the other hand, in the case where the execution of the last CS instruction has resulted in failure, this means the occurrence of collision with the registration processing by another process for the same home position and hence the data element is deleted from the hash table to perform the error return which necessitates retrial (step 1116).

From FIGS. 8 and 9, it is apparent that the registration of a certain data element into its home position when no collision between registration processings occurs is completed by one CDS instruction but the registration into an overflow position necessitates the execution of two or three CS instructions. Further, in the case of the registration into the overflow position, many processings must be performed until the registration counter is updated by the last CS instruction and hence the probability of occurrence of collision is correspondingly increased. Accordingly, in order to enable an effective operation, it is preferable to use a hashing algorithm which makes the probability of registration into an overflow position as low as possible.

INVALIDATION PROCESSING

Figure 10:
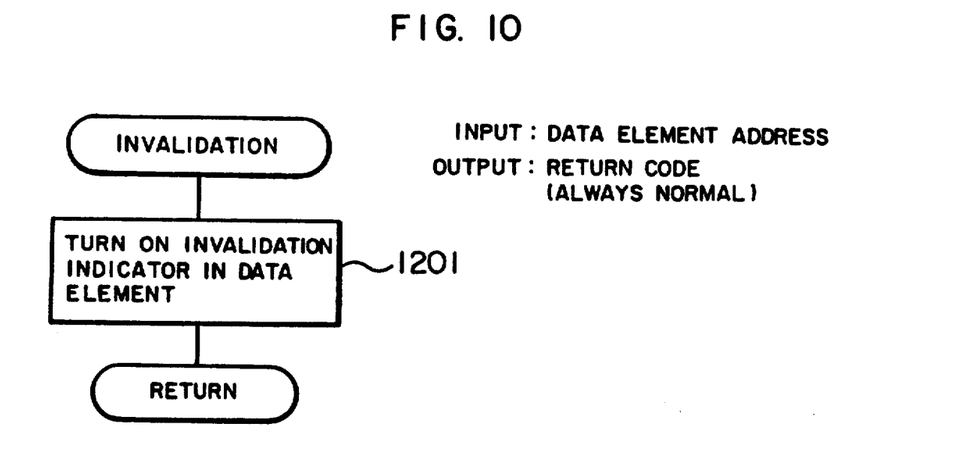
FIG. 10 shows a flow chart of an invalidation processing.

A flow chart of an invalidation processing is shown in FIG. 10. The invalidation of a data element is different from the deletion of a data element (which will be explained below) in that the data element itself remains registered in the hash table. The invalidated data element may be used for data having another key (replacement of data element) or may be reused for data having the same key. In the case of the replacement, since the key of the data element is changed, the data element is once deleted from hash table and a registration processing is thereafter performed by virtue of a new key. The invalidation is completed by turning ON an invalidation indicator in a data element designated by an input (step 1201). This processing needs no CS instruction.

The invalidation processing is not an elementary function indispensable for the hash table operation logic. However, the provision of the invalidation processing is convenient for practical applications.

DELETION PROCESSING

Figure 11:
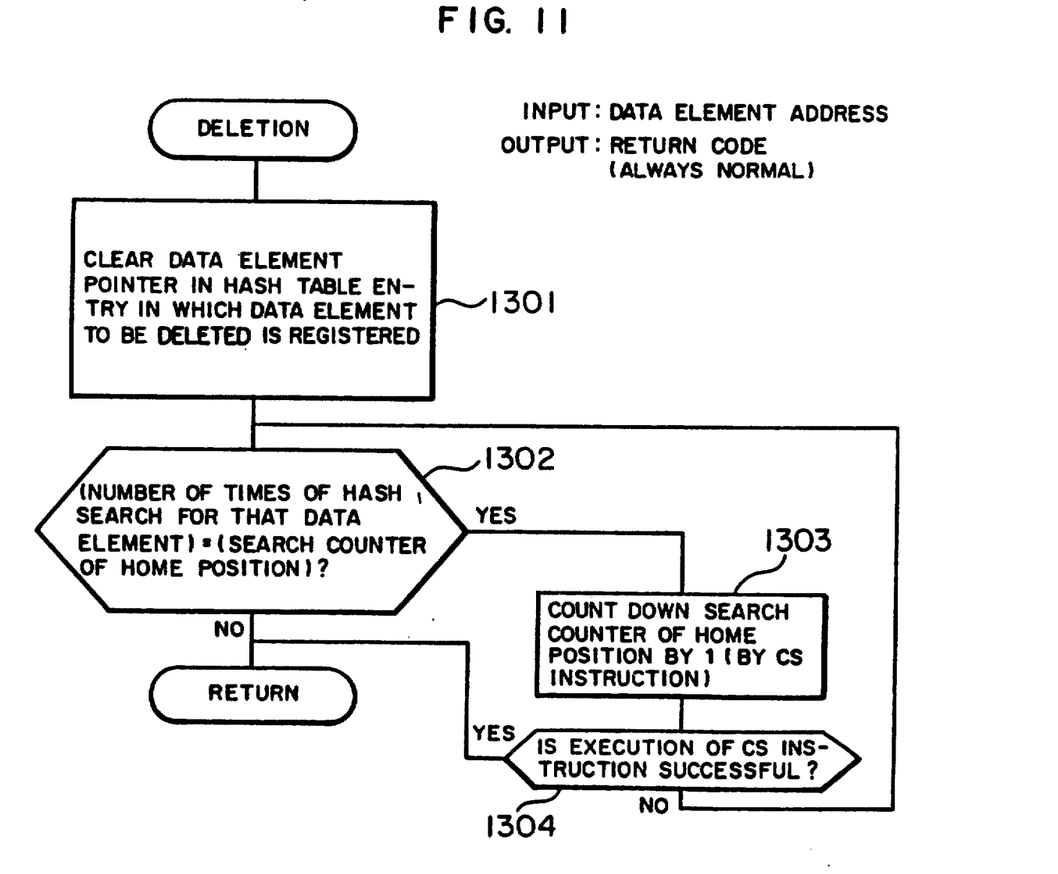
FIG. 11 shows a flow chart of a deletion processing in the embodiment of the present invention.

FIG. 11 shows a flow chart of a deletion logic or processing. An input for the deletion processing includes the address of a data element to be deleted. In the case where it is desired to perform the deletion by designating a key, the deletion can realized with a composite function in which an elementary function of retrieval and an elementary function of deletion are combined with each other.

In the deletion processing, a data element pointer in a hash table entry in which a data element to be deleted is registered is first cleared (step 1301). No CS instruction is required for the clearing. If the number of times of search for vacant position performed upon registration of the data element to be deleted is equal to the value of the search counter of a home position, the search counter is counted down by 1 by a CS instruction (steps 1302, 1303 and 1304). The execution of the CS instruction results in failure when collision with the registration processing by another process for a data element having the same home position as the data element to be deleted has occurred. In that case, the process is retried starting from step 1302.

In the case where the data element to be deleted is registered in its home position, the deletion can be carried out by use of one CDS instruction in a collective manner in which the processing of step 1301 and the processing of step 1302 are unified. This situation is omitted from the illustration of FIG. 11 for simplification. The registration position of the data element to be deleted, the home position of the data element and the number of times of hash search, which are used in the deletion processing, can be derived from a key. However, in the present embodiment, such information is saved into the data element upon registration processing and is referred to upon deletion processing, thereby making it possible to perform the deletion processing at high speed.

As can be understood from the operation made for the search counter during the registration processing shown in FIGS. 8 and 9 and the deletion processing shown in FIG. 11, it does not necessarily follow that the value of the search counter is always coincident with the number of data elements under current registration which belong to the same home position. The search counter value may be larger than the number of such data elements. For example, consider the case where i data elements belonging to a certain home position are registered and the search counter value is i. Then, if the (i-1)th registered data element is first deleted and the i-th registered data element is thereafter deleted, the value of the search counter at this point of time assumes i-1. However, since the (i-1)th data element has already been deleted, the value of the search counter remains i-1 until a data element having the number of times of search therefor larger than i-1 is registered again. Thus, the search counter is nothing but one which provides the uppermost limit for the number of times of search for hash table entry upon retrieval processing. In practice, no problem arises since the probability that the value of the search counter becomes large can be made sufficiently small by employing a hashing algorithm suited to a processing to be performed and preparing a hash table having a great number of entries.

COMPOSITE PROCESSING

Figure 12:
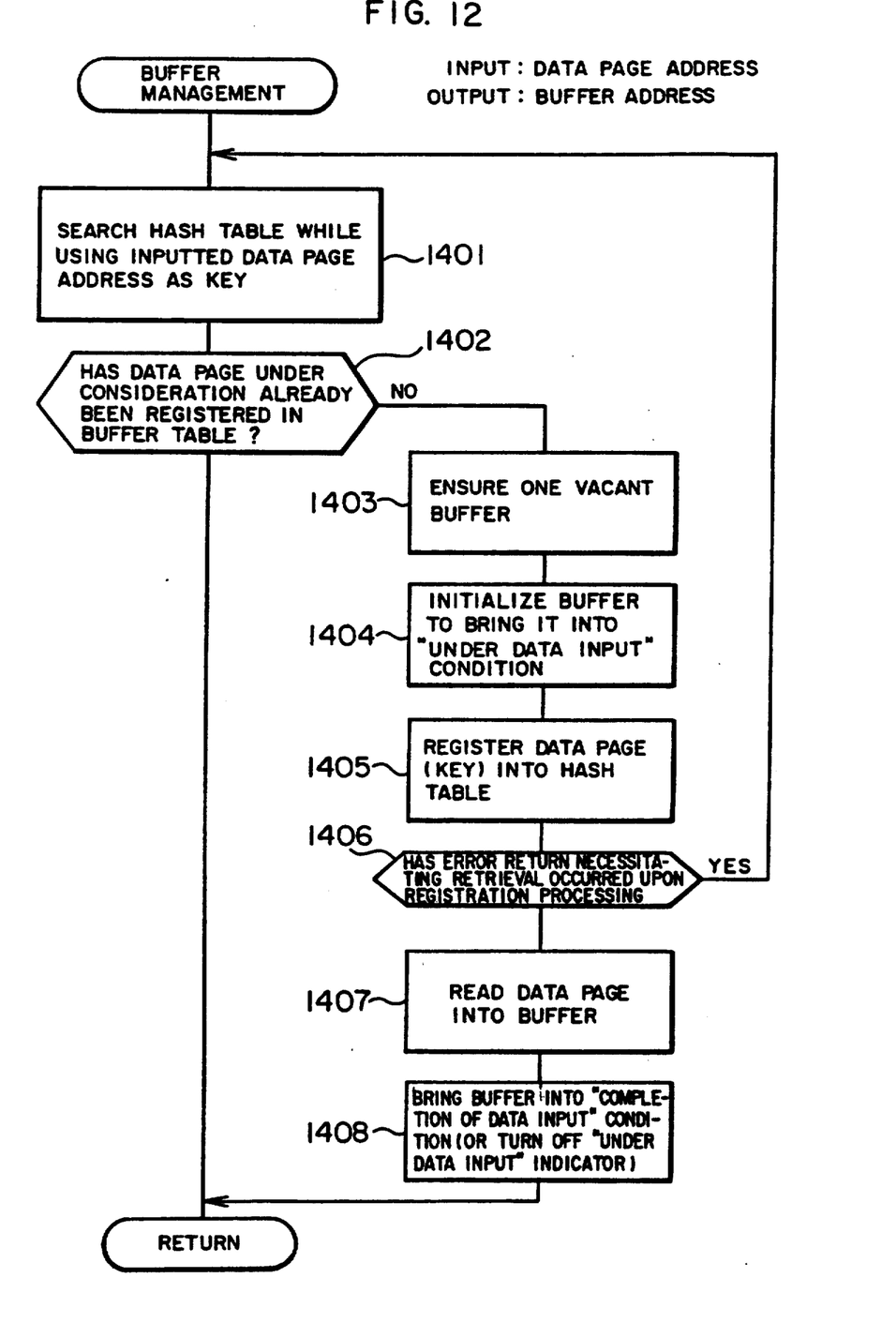
FIG. 12 shows a flow chart of a hash table operation logic according to another embodiment of the present invention in which the above-mentioned various processings are included in combination.

Finally, an example of a composite function as another embodiment of the present invention will be explained in which the above-mentioned elementary functions of the hash table operation logic are combined. FIG. 12 shows a flow chart in the case where the present invention is applied to an input/output buffer management for prevention of double registration. In the present embodiment, data elements are control blocks on a main storage which correspond to buffer areas thereon, and a key is a physical or logical address of input/output data (hereinafter referred to as "data page") on a secondary storage.

FIG. 12 especially shows the flow of the input processing. A search of the hash table is made using an input data page address (step 1401). If a valid data has already been registered in the hash table, the buffer address is returned (step 1402). If a requested data has not been registered on a buffer area in the main memory, one vacant buffer area is ensured or established and thereafter the corresponding control block is registered into the hash table and a data is read from the secondary storage into the buffer area (steps 1403 to 1408). A buffer replacement processing method for ensuring the vacant buffer area may be any known method. If an error return necessitating retrial has occurred upon processing of registration into the hash table, the retrieval is done over again starting from the retrieval processing of step 1401 since there is a possibility that the data page under consideration has been inputted by another process (step 1406).

The registration of the control block may be carried out after having inputted data into the ensured vacant buffer area. In that case, however, an useless or wasteful read processing arises when collision on access to the same data page occurs. One method for ameliorating such a situation includes providing an "under data input" indicator (or flag) into the control block turning ON prior to execution of an actual data input processing so that at this point of time the data page (key) can be registered into the hash table by use of a registration logic (step 1404). If another process making access to the same data page searches the hash table and finds out a control block the "under data input" indicator of which is turned ON, the process is temporarily brought into a waiting condition until the indicator is turned OFF (step 1408). It should be noted that such a process interruption is not caused from the hash table operation logic but is required for waiting the completion of reading.

According to the above embodiments, since the management of a shared resource can be performed at high speed under an environment where a plurality of processes are performed in parallel, there is provided an effect that the overhead of the system can be reduced. Also, the present invention provides a great effect when a large quantity of data elements on a main storage are to be processed, especially, by use of a tightly-coupled multiprocessor.

The above embodiments have been described by way of example. It is needless to say that the present invention is also applicable to other various environments such as multi-task processing environment.

What is claimed is:

1. A method of serializing a plurality of accesses to a plurality of shared resource elements between a plurality of parallel processes through direct use of a single hash table in which each access to each resource element is managed by an instruction which performs an operation of both accessing a status variable in a main storage and updating the status variable in accordance with the value accessed thereof, said method comprising:

providing entries of said hash table, each of which entry has a pointer pointing to a one of the resource elements and a first counter indicating a request from a first parallel process for a registration of a first resource element into said hash table as a first value; and updating at least a part of an entry of said hash table by said instruction while detecting a process collision on access to said first counter caused by a second parallel process based on whether said first value of said first counter is changed by the second process.

2. The method according to claim 1, further comprising the steps of:
   providing a second counter indicating an uppermost limit of a number of times a search of said hash table is to be performed by said request from said first process related to a registration process of a resource element in an entry of said hash table, the number of times of the search being determined by a counting up operation in said registration process of each resource element; and,
   updating each entry of said hash table including said second counter by a read-modify-write instruction in the registration process.

3. The method according to claim 2, further comprising a step of judging whether the resource element to be accessed through the pointer is present or absent in said hash table by searching with the uppermost limit of entries in said hash table indicated by said second counter which indicates an entry in said hash table having said pointer indicating the resource element.

4. The method according to claim 1 further comprising performing a read-modify-write instruction as said instruction according to a Compare and Swap instruction operation.

5. The method according to claim 1, wherein the step of updating comprises updating said first counter in each entry in said hash table when registering each resource element having a hash value obtained from hashing a key value of the resource element corresponding to each said entry in said hash table.

6. A method of serializing access to shared resource elements between a plurality of parallel processes by use of a hash table having entries, said method comprising the step of updating each entry of said hash table including a pointer indicating a first one of the resource elements, a registration counter for storing and indicating occurrence of a registration of an access request from each process into said hash table, and a search counter for storing and indicating a number of times of search into overflow entries of said hash table, by a read-modify-write instruction while maintaining the integrity of data therebetween, said read-modify-write instruction performing both an access to a status variable in a main storage and an updating of the storage variable in accordance with the value accessed.

7. A system for serializing access to shared resource elements in a data element pool between a plurality of parallel processes by use of a hash table, in which the access of each of the processes to each resource element is managed by an instruction which performs an inseparable operation of both referencing a status variable in a main storage and updating the status variable in accordance with the referenced value thereof, said system comprising:
   information storing means for storing entries of said hash table, each of which entry has a pointer indicating one of the resource elements and a first counter indicating a request from a process related to a registration of a resource element into said hash table; and,
   hash table operation logic means for updating at least a part of an entry of said hash table by said instruction for performing the inseparable operation on the main storage according to a first process while detecting a process collision on access to said first counter occurring from a second process on the basis of whether or not a value of said first counter is changed by the second process.

8. The system according to claim 7, further comprising means for judging whether the resource element to be accessed through said pointer is present or absent in said hash table by searching with an uppermost number of entries in said hash table indicated by a search counter which indicates an entry in said hash table having said pointer indicating the resource element.

9. A system for serializing access to shared resource elements between a plurality of parallel processes by use of a hash table, said system comprising:
   hash table storing means for storing entries of said hash table, each of which entry has a pointer indicating one of the resource elements, a registration counter storing and indicating occurrence of resource element registration into said hash table, and a search counter storing and indicating a number of times of search into said hash table; and,
   hash table operation logic means for updating an entry of said hash table by an instruction which performs an inseparable operation of both accessing a status variable in a main storage and updating the status variable in accordance with the accessed value thereof.

* * * * *